April 19, 1960    S. W. ROSS ET AL    2,933,605
FAST NEUTRON FILM DOSIMETER
Filed June 24, 1957
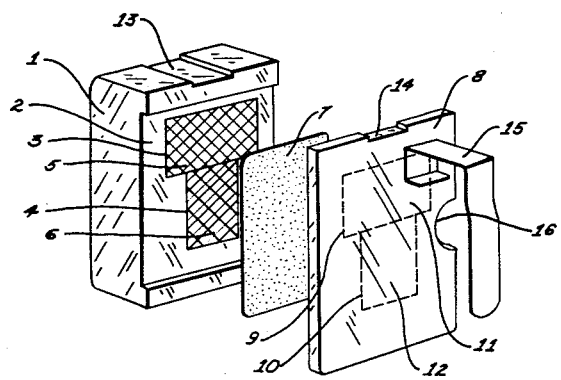
INVENTOR.
Steven W. Ross
Eugene Tochilin
BY
George Sipkin
ATTORNEYS

United States Patent Office 2,933,605
Patented Apr. 19, 1960

2,933,605

FAST NEUTRON FILM DOSIMETER

Steven W. Ross, Redwood City, and Eugene Tochilin, San Francisco, Calif., assignors to the United States of America as represented by the Secretary of the Navy Application June 24, 1957, Serial No. 667,724

2 Claims. (Cl. 250—83.1)

(Granted under Title 35, U.S. Code (1952), sec. 266)

The invention described herein may be manufactured and used by or for the Government of the United States of America for governmental purposes without the payment of any royalties thereon or therefor.

This invention relates to dosimetry and more particularly to a film badge type of dosimeter for reading fast neutron dosages.

At present, suitable nuclear track emulsions are employed for monitoring fast neutrons, these emulsions then being developed and the tracks counted by a high-power microscope. Reading a large number of such plates is not only time consuming but tiresome and the operators must be specially trained. Further, such emulsion-type dosimeters do not cover the spectrum below ½ mev. and in many instances this may be the only energy present so that extensive damage is brought about before detection. Various attempts to overcome such a limitation have been made and the results show either an insufficient, or oversensitive, indication for practical use. These restrictions limit the detection range of spectrum which render such badges unacceptable for the purpose of evaluation around reactor personnel where a wide range of fission neutrons may, such as 250 mev. to 6 mev., be present. In addition, thermal neutrons may be present in the vicinity of the workers and a badge is needed which renders some indication of their presence. Hence, an all purpose dosimeter is desired.

Therefore, an object of the present invention is to devise a dosimeter which is sufficiently sensitive for the detection of fast fission neutrons in the low energy spectrum, and comparatively easy to read.

Another object is the provision of a small, compact, and light dosimeter that may be worn by personnel around reactors where fission neutrons are emitted, and which may be used to monitor both neutron and gamma radiation.

Still another object is to provide a quickly-read dosimeter in which converted energy is substantially unattenuated so as to insure maximum sensitivity and accuracy.

According to this invention a suitable moderator is used to thermalize fast neutrons, the thermal neutrons then striking a converter plate which in turn yields a secondary emission capable of exposing an underlying film. Most suitably, metal foils on one face of the moderator plate convert the thermal neutrons to other forms of radiation which in turn expose a film of a packet. Beyond the packet preferably are additional metal foils positioned against a second plate which acts as a moderator for neutrons impinging from the opposite direction. The second plate, as well as the first, has depressions therein for positioning metal foils. The plates, foils, and film are held in juxtaposition by suitable means.

Preferably, the metal foils are of different material. A combination of metals is then positioned in a depression of one plate. One of the other metals is used to fill the remaining depression and the two depressions, with foils positioned therein, each constitutes a window. The foils are matched so no difference in film density is observed under the windows for a gamma ray exposure. The foils are sufficiently thick so that energy dependence for low energy X-rays is minimized. The moderated thermal neutron flux will cause the two metal foil combination to effect a more dense reading. Thus, the badge serves as a monitor, both for neutron and gamma radiation.

The drawing shows the essential elements of a dosimeter of the type described herein, shown in an exploded view.

By referring to the drawing it may be seen that the dosimeter essentially consists of moderator plates, metal foils, and a film packet. Moderator 1, the function being to slow the fast neutrons to thermal energies, has a groove 2 and two depressions 3, 4, in one face thereof. Positioned in the depression are two metal foils 5, 6, which are held therein by film packet 7 positioned in the groove over the foils. Beyond the film packet is a thinner moderator plate 8, having depressions 9, 10, in one face thereof. Two metal foils 11, 12, are positioned in these depressions and held there by film packet 7. The top edges of the two moderator plates have grooves 13, 14, therein to accommodate a metal clip, employed to hold the film badge dosimeter on the wearer's belt, or other suitable location, so the wearer's body can be used as a back scatterer. Some suitable means (not shown) may be employed to hold the various parts of the badge together.

The moderator plates 1 and 8 are made of a solid having a high hydrogen content, thereby permitting the required thickness to be less and retaining the function of thermalization of the fast neutrons. Any suitable solid possessing such characteristic having at least a hydrogen atom content of $4 \times 10^{22}$ per cubic centimeter may be employed, such as polyethylene which is light and easy to work. Thermalization of fast neutrons coming from a reactor which effects fission neutrons, is accomplished by employing such a moderator. The degree of sensitivity the thermal neutrons effect in the foils depends upon the thickness and material of the moderator being impinged upon by the fast neutrons. Fission fast neutrons generally bring about a peak sensitivity with a polyethylene moderator of substantially 1.5 inches thick, so the moderator may be of any convenient thickness, as ¾ inch. A sensitivity loss of about 20% results but a smaller, more compact badge that is more comfortable to wear is obtained.

The moderator may be of any convenient shape, such as rectangular, as shown in the drawing. In one face a groove 2 is provided of a suitable depth to accommodate the film packet, 7. An additional plate (not shown) may be positioned on the neutron impinging side of plate 1 and a suitable groove provided in plate 1, or the additional plate, to hold a nuclear track emulsion. The nuclear emulsion is used whenever a high gamma exposure or a serious over-exposure of neutrons is indicated, or under any condition where a more accurate evaluation of the fast neutron dose is warranted. Thus, the subject badge serves to indicate that the wearer is exposed to neutrons. Resort to the nuclear track emulsion will signify whether the neutrons are fast or thermal. In addition to groove 2, the moderator plate has depressions, shown at 3 and 4, in one face surface. They may be of any chosen shape, such as oval and of suitable depth. In this instance the upper depression 3, is about 0.040 inch deep to accommodate a combination of foil material. However, the lower depression 4 is approximately 0.050 inch deep to accommodate a foil positioned therein. It will be readily appreciated that depressions are of sufficient depth to permit the foils to be positioned therein and remain substantially flush with the surface of groove 2.

Another moderator plate 8 is used in the dosimeter but is of less thickness than plate 1, which is due to a decreased need for thermalizing material. The wearer's body acts as a moderator for fast neutrons impinging the badge from the side opposite plate 1, and hence, plate 8 may be of some chosen thickness, such as ⅛ inch. Plate 8 also has depressions 9, 10, provided for the same purpose as those in the first mentioned plate. The material of the plate, its shape, and the size and shape of the depressions, may be like those of plate 1, chosen for the same purpose and function. Further, plate 8 has a suitable groove 16 in one edge thereof, to permit insertion of the film packet between the foils. Ancillary to this purpose a suitable groove (not shown) may be provided in plate 1. In addition, some convenient means may be employed to hold the various elements together. This may consist of a suitable plastic case or a set of pegs (not shown) made of some chosen material, such as plastic, attached to one moderator plate and insertable into openings provided in the other plate.

Moderator plates 1 and 8 have grooves 13 and 14 respectively in the upper portion of the top edge thereof. These accommodate a small clip 15 which is made of spring steel or other suitable material and is utilized to hold the dosimeter on the wearer's person. The clip is of any suitable shape, such as shown in the drawing, to accomplish its function of connecting itself on the badge.

Metal foils 5, 6, 11, and 12, are affected by the neutrons, and other radiation present, to bring about exposure of the photographic film within the packet. By placing the foils substantially in contact with the film, the sensitivity to thermal neutrons can be greatly increased. The thickness and type of material of the foils determines the effect the radiation (whether neutrons or other forms of particles, or rays of various forms) has on the film. As known, the total cross section of the foil material comprises capture, fission, and absorption cross section, and nuclear cross section is measured in units termed barns. The thermal neutron capture cross section of the chosen material should be 50 barns or better.

Since the interaction of moderated fast neutrons (thermal neutrons) with films is so minor and therefore unreliable, it is necessary to convert the thermal neutrons into another form of radiation, such as gamma and/or beta. Various metals may be utilized for this purpose and in this instance, silver was chosen. The material so chosen should also have a half life of 1 hour or less. Activation of silver by thermalized neutrons effects the emission of beta rays having a range between 1.7 to 2.8 million electron volts (mev.) with a short half-life of substantially 2.3 minutes. Such a half life permits the film to be developed within minutes after an exposure without unnecessary loss of sensitivity. Further, the activity may decay sufficiently before development of the film, which substantially prevents the results from being time dependent. Further, silver assures that the film response will be more nearly independent of wide variations of radiations of gamma. Such is the result in this instance because silver converts the neutron flux to beta radiation which effects exposure of the film. Substantially no beta is given off by the silver as a result of the impingement thereof by gamma. Hence, most of the exposure of the film by betas will be effected by the silver converter being impinged by neutron flux. High energy betas from the silver converter can penetrate the entire film packet of wrapper and film without much attenuation.

One depression has a foil of tin or other suitable material therein which emits substantially no radiation when impinged by neutrons. However, gamma rays readily pass through such a material, and a proportional portion of the film is thereby exposed. Substantially no beta radiation will be emitted from tin when impinged by neutrons. Therefore the converter indicates the amount of neutrons and the tin indicates the gamma. In this instance the silver-tin combination 5, chosen for upper depression 3 may be a 0.015 inch layer of silver with a 0.025 covering of tin. In lower depression 4, a single layer of 0.050 inch of tin foil 6, may be used. It has been found that such a combination of foils, backed by a film packet, effect no difference of film density for $CO^{60}$ gamma rays. Further, such filters or windows minimize dependence of low energy X-rays on energy.

Hence, a difference in density of the film areas substantially indicates the amount of neutron flux, since the gamma radiation is the same for each window, as is the neutron flux, but the neutron flux exposes the film under the top window 3 and substantially does not do so under window 4.

The film may be of any conventional type, and held in its conventional packet. High energy spectra sometimes found around accelerators will produce insufficient film blackening as the amount of thermalization by the moderator under such conditions is small. Further, a large amount of gamma radiation brings about enough blackening of the film, upon development, so that differences in the readings behind the two windows or shielded regions becomes insufficient to be accurately measured. Since, in such an instance, gamma rays create a general blackening of an emulsion, but not the formation of tracks, the badge may contain a nuclear track emulsion in lieu of, or in addition to, the usual film packet, which determines neutron exposure by the tracks produced in the film.

In practice, the badge may be supported on the wearer's belt by clip 15 and the various elements are held together by some suitable means. The moderator plates are made of a material having a high hydrogen content, and are thick enough to bring about sufficient sensitivity for use with fission fast neutrons. The foil converter is made of a well chosen material having a high thermal neutron capture cross section and is of proper thickness so that thermalized neutrons will expose a film placed in contact therewith. Such characteristics of the badge permit it to indicate a large portion of a fission neutron spectrum. In addition, the moderator plates are made of a light, sturdy material and are sufficiently small and light so that, along with the film packet and foils, a small, compact, light weight dosimeter is constituted which may be worn by personnel working around reactors. Foils are chosen having a combination of materials and matched so no difference in film density is observed on the developed film for some gamma rays and energy dependence for low energy X-rays is minimized. The moderated neutron flux will cause one foil to bring about greater density on the developed film and the difference between the two readings, taken on a densitometer which is comparatively easy to read, indicates the neutron flux. Thus, the dosimeter serves as a monitor, both for neutrons and gamma radiation. Choice of a foil used for converting the thermalized neutrons to another form of radiation with a short half-life permits the film to be developed within a short time after an exposure without loss of sensitivity and also since the activity has decayed sufficiently before development of the film the results are prevented from being time dependent. Converted energy is substantially unattenuated since the converter emits radiation which exposes the film, thus giving an accurate account of the impinging neutrons. The badge may contain a nuclear track emulsion in addition to the usual photographic film packet. Emulsions may be developed and the tracks counted by a high-power microscope. The nuclear emulsion is used whenever a high gamma exposure or a serious over-exposure of neutrons is indicated, or under any condition where a more accurate evaluation of the fast neutron dose is warranted. Hence, the features of the badge permit it to be used for a wide range of conditions.

Obviously many modifications and variations of the present invention are possible in the light of the above teachings. It is therefore to be understood that within the scope of the appended claims the invention may be practiced otherwise than as specifically described.

We claim:

1. A dosimeter having the combination of means for indicating substantially the full range energy spectrum of fission neutrons and for monitoring the presence of other radiation; said combination comprising a light weight moderating plate for thermalizing the fast neutrons of said full range energy spectrum, said plate having a hydrogen atom content of no less than $4 \times 10^{22}$ atoms per cubic centimeter, means for converting such thermalized neutrons to other forms of radiation and for absorbing still other forms of radiation, said last mentioned means comprising a plurality of metal foils one having a capture cross-section of at least 50 barns and another being substantially transparent to neutrons, means for indicating the extent of the radioactive forms emanating from the converting means, and means for holding the various means closely adjacent one to the other.

2. A dosimeter consisting of the combination of means for indicating substantially the full range energy spectrum of fission neutrons and for monitoring the presence of other radiation; said combination comprising a light weight moderating plate for thermalizing the fast neutrons of said full range energy spectrum, said plate having a hydrogen atom content of no less than $4 \times 10^{22}$ atoms per cubic centimeter, means for converting such thermalized neutrons to other forms of radiation and for absorbing still other forms of radiation, said last mentioned means comprising a plurality of metal foils one having a capture cross-section of at least 50 barns and another being substantially transparent to neutrons, means for indicating the extent of the radioactive forms emanating from the converting means, second means comprising a plurality of metal foils having material characteristics similar to the first mentioned converting means for converting thermalized neutrons impinging still another plate to other forms of radiation and for absorbing still other forms of radiation, a light weight moderator plate having a hydrogen atom content of no less than $4 \times 10^{22}$ atoms per cubic centimeter positioned against the said second converting means, and means for holding the various means closely adjacent one to the other.

References Cited in the file of this patent

UNITED STATES PATENTS

| 2,186,757 | Kallmann et al. | Jan. 9, 1940 |
| 2,556,768 | McKibben | June 12, 1951 |

OTHER REFERENCES

Dessauer et al.: Atomic Energy Commission document AECD-2278, 4 pages, declassified September 14, 1948.

Deassauer et al.: Atomic Energy Commission document AECD-1973, 7 pages, declassified May 12, 1948.